Patented Mar. 28, 1939

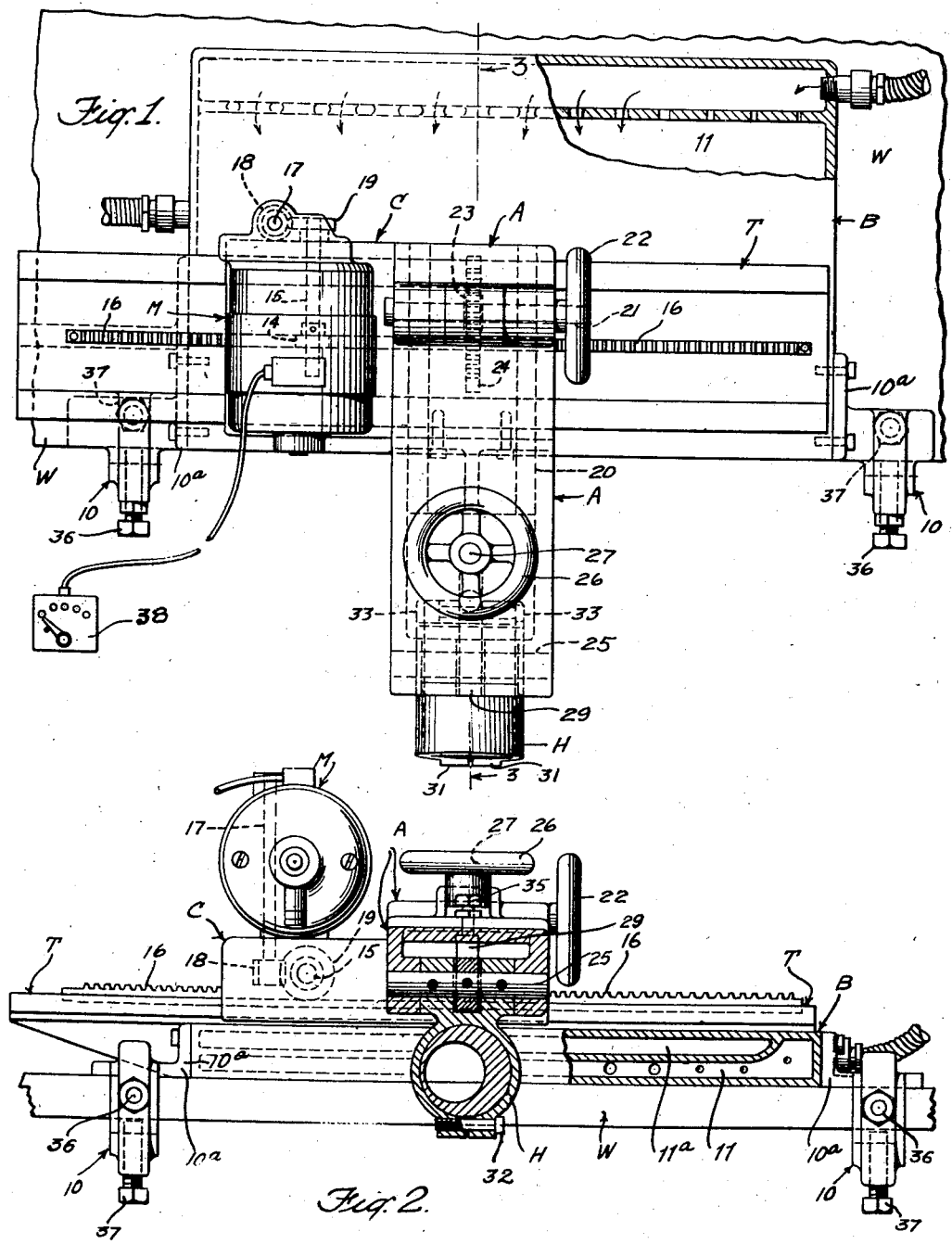

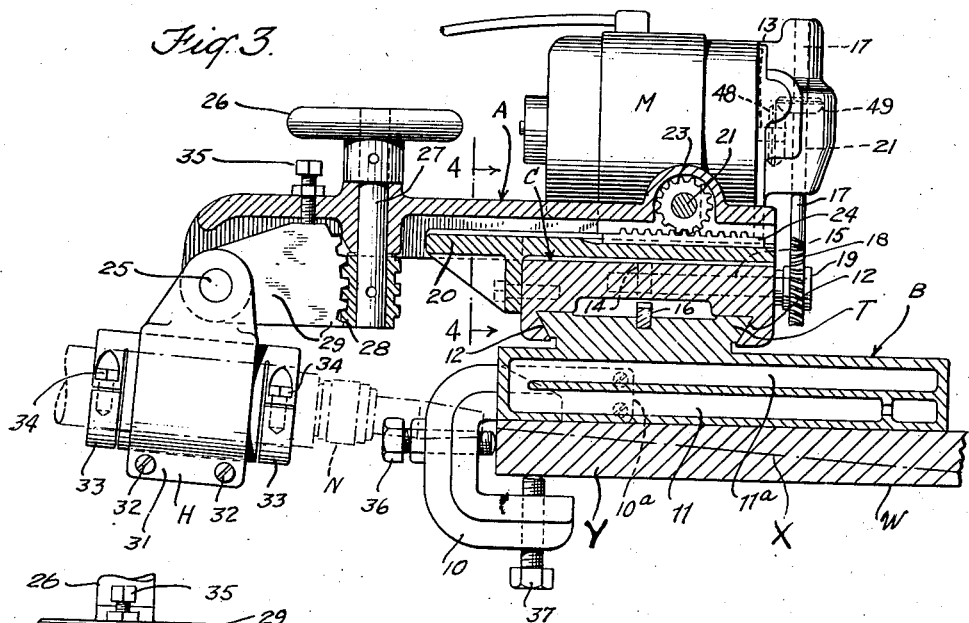
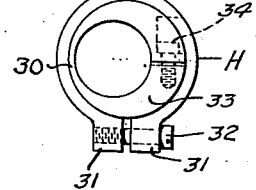
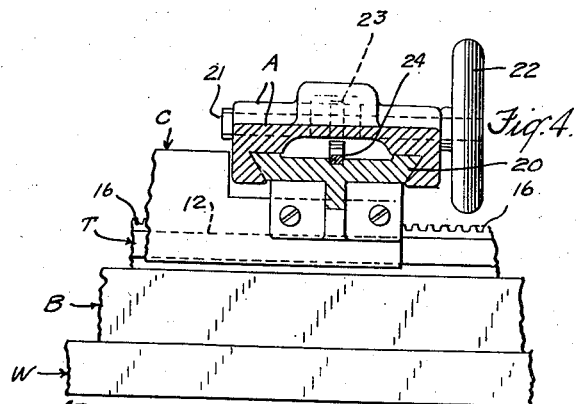
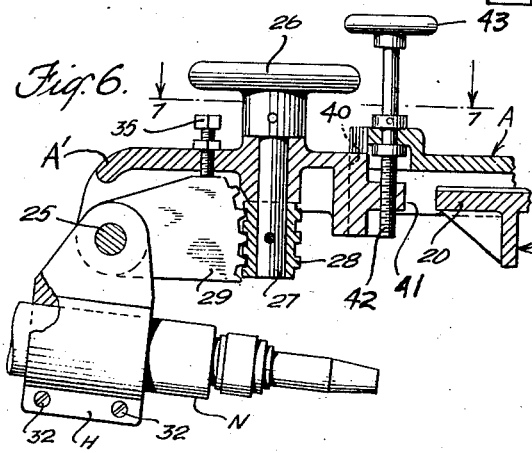
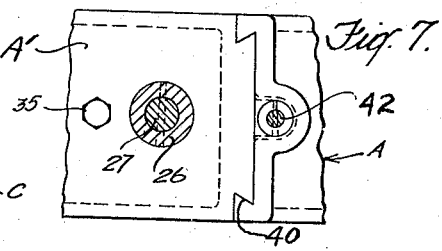

2,152,213

UNITED STATES PATENT OFFICE 2,152,213

METAL SCARFING MACHINE AND PROCESS

Walter B. Rowland, Upper Montclair, and Walter E. Linden, Palisades Park, N. J., assignors, by mesne assignments, to Union Carbide and Carbon Corporation, a corporation of New York Application July 30, 1932, Serial No. 626,864
Renewed August 20, 1936

15 Claims. (Cl. 148—9)

This invention relates to a process for operating on metallic bodies by means of a torch and to a machine for performing the process. The invention has particular application in the scarfing of ship plate in order to provide a bevel of small angle to a given reference surface along one edge thereof.

The cutting of bevels or scarfs upon metallic objects of a 45° angle or greater may be accomplished with comparative ease with a manually operated cutting torch, with a straight line cutting machine or with an oxy-gas torch mechanically moved at the desired angle and the required distance for producing the bevel. The cutting of a bevel by use of a torch at less than 45° from a selected surface, however, is more difficult and increases in difficulty progressively as the acute angle decreases inasmuch as the thin edge of the plate produced thereby has a tendency to burn or melt due to the heat of the molten slag produced. This fact raises a problem of considerable importance in the process of scarfing, especially in the scarfing of ship plates which are very heavy and expensive so that the spoiling thereof entails a considerable loss to the ship builder. These plates, in order that they may be properly applied one upon another for certain purposes, are frequently scarfed along an edge to an angle of from two to four degrees from the reference surface. To this end, the plates have in the past been ordinarily cut by use of special machine shapers and to some extent by hand operated oxygen cutting torches. The former of these methods is slow, tedious, and costly; while the latter requires a steady hand and great skill, is fatiguing and difficult of accomplishment, and is carried out with great hazard of melting or burning through the thin feather edge to be produced.

It is an important object of the invention, therefore, to provide a novel process and novel mechanism to facilitate the carrying forward thereof whereby scarfing and similar operations on metallic objects may be performed with greater speed and facility than has heretofore been possible, without danger of damaging the work operated upon, and with a minimum of fatigue to and requirement of skill on the part of the operator.

In accordance with the invention, the removal of a portion or successive portions of a metallic body by scarfing or otherwise may be conveniently accomplished by directing gaseous heating and cutting jets against the portion to be removed and along the plane of severance. The portion of the body to be removed is preferably positioned on the underside so as to fall by gravity with the slag formed in making the cut away from the body, thus preventing adherence of the slag and cut away portion to the body and communication of its heat to the body.

In case the body is to be scarfed to a thin edge, as in forming a bevel on one face of a ship plate at a small angle to the opposite face, the heating and oxidizing jets may be directed downwardly and obliquely against the edge of the plate to be scarfed at the desired angle of the beveled edge and at a pressure and velocity sufficiently high to cut through the entire length of the scarf. A pressure of about 80 lbs. is found satisfactory and, in making the cut, the jet enters at the edge and emerges in the face of the plate being scarfed a distance back of said edge equal to the full length of the scarf. When applying the high velocity heating and cutting jets in this manner, the torch is moved, the while, along the edge of the plate in spaced, parallel, fixed relation thereto while being maintained at the desired angle of the scarf; the travel being at a comparatively rapid rate, say about one foot in about $2\frac{1}{10}$th minutes.

In order to prevent the burning through or melting of such an edge, the opposite surface to that being scarfed may be suitably cooled in the region and in opposition to the scarfed portion. To this end suitable cooling apparatus may be employed which may be in the nature of a chill or cooling block provided with means for circulating a cooling fluid, as compressed air or water, therethrough.

The heating and cutting jets are preferably moved at a uniform rate such as will dependably complete the cut without danger of "burn throughs" or melting down of the edge. In so moving along the edge, the jets will impinge on the edge so as to effect the cut along the diagonal plane of the desired bevel for which the torch nozzle is set.

In carrying out the process mechanically, the chill block may be suitably clamped to the work and may serve as the base of a machine comprised of a track and a carriage having travel therealong and adapted to support a torch so as to direct its heating and oxidizing jets upon the edge of a plate or other object at a proper angle during the travel of the carriage. The block may be cored or drilled to permit the circulation of a suitable cooling fluid therethrough and the torch may be mounted on the carriage for manipulatory manual adjustment during operation. The mounting of the torch may be such as to provide for universal adjustment thereof and so that the cutting operation will be, at all times, under sensitive manual control without any considerable fatigue or strain and without any considerable requirement of skill on the part of an attendant.

The above and other objects and novel features of the invention will become apparent from the following specification taken with the accompanying drawings, in which, Fig. 1 is a plan view of a machine constructed in accordance with the invention and showing the same as clamped to work being operated upon;

Fig. 2 is a front elevational view thereof, parts being shown in section;

Fig. 3 is a view in sectional elevation on the line 3—3, Fig. 1;

Fig. 4 is a sectional view on line 4—4, Fig. 3;

Fig. 5 is a detail view of the adjustable torch support;

Fig. 6 is a detail sectional view showing a constructional modification from that shown in Fig. 5 for raising and lowering the torch; and Fig. 7 is a fragmentary sectional plan view on the line 7—7 of Fig. 6 looking in the direction of the arrows.

The machine as illustrated in the drawings comprises, in its principal parts, a base B which may be in the nature of a chill or cooling block and may serve as a support for a track T secured thereto or formed integrally therewith, as shown, and upon which a carriage C is slidable mounted for travel therealong. The carriage is propelled along the track by a suitable motor M mounted on one end of the carriage and suitably connected with traction means. On the other end of the carriage is mounted a bracket arm A which constitutes a secondary carriage adjustable laterally to the carriage C. To the outboard end of this arm A is pivotally secured a holder H for the adjustable support of a torch nozzle N which is adapted to direct suitable heating and oxidizing jets, such as an oxy-acetylene flame and a jet of oxygen, onto the work. This machine is adapted to be mounted upon the work W, such as a ferrous metal plate, and preferably secured thereto by suitable means as modified C-clamps 10 secured to the base B as by brackets 10a.

The base block B is designed to rest on the work above the cut being made and is provided with means to effect the cooling of desired parts of the body of the metal and to prevent the melting or burning through of the feather edge being formed. To this end, the block may be made of copper, steel, cast iron or other suitable high heat conductive material and may be cored or drilled as at 11, 11a to provide passages for the circulation within the block of a cooling medium, as compressed air or water. The cooling member or base block B thus constitutes means providing a cooling influence carried by the carriage C for extracting heat from the portions of the body to which the cutting jet is applied.

The track T may be, as shown, of a dovetail construction with which the walls of a correspondingly shaped recess 12 in the carriage C engage and the carriage may be moved along the track to effect translation thereof along the surface of the work at a uniform rate by power from the motor M. To this end, the shaft 13 of the motor is in driving connection with a pinion 14 mounted on a shaft 15; the teeth of the pinion being in engagement with those of a rack 16 secured to the track T and extending longitudinally thereof.

The driving connection between the motor shaft 13 and shaft 15 is effected through bevel gears 48 and 49, a vertical shaft 17 and suitable reducing gears 18 and 19.

A track 20, similar to the track T, is provided on one end of the carriage C extending transversely thereof upon which the arm A is slidably mounted for adjustment laterally of the carriage and a shaft 21 is journaled to the arm and provided with a handwheel 22 at one end; a pinion 23 being secured to the shaft intermediate its ends which is in engagement with a rack 24 secured to the track 20 so as to extend parallel thereto.

The blowpipe holder H is pivoted to the outboard end of the arm A by a pin 25 to provide for angular adjustment of the holder in a vertical plane in order to enable the operator to direct the heating and cutting jets from the nozzle N against the edge of a plate at the desired angle of the cut to be made. This adjustment may be accomplished, as shown, by means of a hand wheel 26 secured to a vertical shaft 27 which is journaled in the arm A and is provided with a worm 28 in engagement with a sector of a worm gear 29 formed as a part of and preferably integral with the holder H.

By means of the mechanism just described both horizontal and angular adjustment of the torch relatively to the work may be effected. Adjustment thereof vertically is also desirable and may be effected by any suitable means. In one form of the present disclosure, this adjustment is provided for by supporting the torch nozzle N in an eccentric sleeve 30 rotatably mounted in the holder H. In order that the sleeve 30 may be rotated freely for this purpose and clamped in various adjusted positions, the holder H is of split ring construction and is provided with parallel, opposing ears 31 connected by screw bolts 32. The eccentric sleeve 30 is provided with a bore sufficiently large to permit the nozzle to slide freely therethrough and has split ring members 33 preferably formed integrally therewith at its ends and with screw bolts 34 for drawing the ends of the split rings 33 together to grip the nozzle and hold it firmly in the sleeve.

An alternative construction providing for vertical adjustment of the torch is illustrated in Figs. 6 and 7 of the drawings wherein the outboard end A' of the arm A is shown as made separately from the rest of the arm; the two parts being connected in sliding engagement by the dovetailed construction as shown at 40; the vertically slidable frame portion A' having an apertured ear 41 threaded for engagement with a screw 42 which is journaled in the main portion of the arm A and operable by a hand wheel 43 secured thereto. In this construction, of course, the eccentric 30 may be omitted.

A set screw 35 is provided in the arm A or portion A' thereof to maintain the holder H in its various positions of angular adjustment and set screws 36 and 37 are provided in the clamps 10 for properly positioning the block B upon the work and for holding the clamps firmly connected therewith.

In carrying out the above process by means of the machine as herein described, the machine is positioned on the work so as to rest above the portion to be scarfed off which portion is preferably positioned in the underside of the plate and where the process is applied to scarfing ship plates, which are quite heavy, the plate may be first laid on the ground and the end which is to be scarfed may be raised to a height of some three or four feet. The scarfing machine may then be set on top of the plate in the manner indicated above, alignments being made by means of the set screws 36 on the C-clamps. When the machine is so mounted, the arrangement is such that the torch overhangs the edge of the plate with its nozzle pointing toward but spaced from from said edge and is adjusted to the angle of the desired scarf, preferably being inclined downwardly at an acute angle from the horizontal. The cut is preferably made from the underside of the plate so that the slag formed thereby, the molten metal, and the wedge of solid surface metal cut out, such as indicated at Y in Fig. 3, will fall away from the plate by gravity; thereby eliminating its heating effect on the edge and preventing its adherence to the body of the plate. A characteristic plane of cut is indicated by the line X in Fig. 3. The chill block with the cooling fluid circulating therethrough serves, the while, to preserve the feather edge being formed and to prevent "blow-throughs" in the body of the plate. The machine is under constant supervision of an attendant during operation, and the torch is sensitively responsive to adjustment to various angles through hand wheel 26 and to lateral adjustment of the edge of the work through hand wheel 22. Prior to the application of the cutting jet to the work, the nozzle N is adjusted to the proper vertical level by means of the eccentric sleeve 30 or by means of the hand wheel 43, manipulated in the manner as set forth above. The pressure and velocity of the cutting oxygen jet or oxidizing gas stream are preferably quite high and should be sufficiently high to cut through the entire length of the cut as indicated by the line X. A rather sensitive control over motor speed is desirable and the electrical drive for the carriage may therefore be reversible and capable of speed variations through suitable speed control means, as by provision of a rheostat 38 or magnetic governor.

By the process described above particularly as carried out by use of the machine herein outlined, the speed of operation is materially increased over processes heretofore known while at the same time danger of damaging the work being operated upon is reduced to a negligible consideration and, while the process and apparatus have been particularly described herein as applicable to the scarfing of ship plate, the same are capable of a wide range of uses on account of their faculty for cutting various bevel angles with assurance of protecting, by use of the chill block the edge and body of the plate from melting down of the edge, from "blow throughs", and from other damage.

We claim:

1. The process of scarfing the edge of a metal plate or the like, which consists in directing gaseous heating and oxidizing jets against said edge along a plane extending from said edge diagonally through said plate and emerging in one face of said plate back from said edge; and, during the application of such heating and oxidizing jets, cooling the other face of said plate adjacent said edge.

2. Process of scarfing the edge of a metal plate or the like, which comprises directing gaseous heating and oxidizing jets against said edge along a plane extending from said edge diagonally through said plate and emerging in one face of the plate back from said edge; and, during the application of such heating and oxidizing jets, cooling the other face of said plate adjacent said edge while moving said jets at a uniform rate relatively to said plate and parallel to and at a fixed distance from said edge.

3. A machine for scarfing the edge of a metal plate or the like, comprising the combination of means for delivering heating and oxidizing jets; means for so supporting such jet-delivering means that said jets will impinge upon said edge along a plane extending from said edge diagonally through said plate and emerging from one face thereof; means for moving said jet-delivering means along, but spaced from said edge; and means adapted to prevent overheating of the metal of the scarfed edge being produced.

4. A machine for scarfing the edge of a metal plate or the like, comprising the combination of means for delivering heating and oxidizing jets; means for so supporting such jet-delivering means that said jets will impinge upon said edge along a plane extending from said edge diagonally through said plate and emerging from one face thereof; means for moving said jet-delivering means along, but spaced from said edge; and means for withdrawing heat from the other face of the plate adjacent said edge.

5. A machine for scarfing the edge of a metal plate or the like, comprising the combination of means for delivering heating and oxidizing jets; means for so supporting said jet-delivering means that said jets will impinge upon said edge along a plane extending from said edge diagonally through said plate and emerging from one face thereof; means for moving said jet-delivering means along, but spaced from said edge; and a heat-conductive metal block bearing against the other face of said plate adjacent said edge; and means whereby cooling medium may be circulated through said block.

6. A machine for removing solid surface metal adjacent an edge of a metallic body comprising the combination of a carriage adapted to be mounted on the upper surface of a body; a torch carried by said carriage and adjustable relative thereto; said torch being adapted to direct a cutting jet against an edge of said body so as to remove solid surface metal at one side of the body; and means including a cooling block for extracting heat from the surface of said body opposite to that from which metal is removed.

7. A machine for removing solid surface metal adjacent an edge of a metallic body, which comprises the combination of a cutting torch; means on the body for supporting the torch opposite such edge to remove solid surface metal; said torch being inclined at an acute angle from the horizontal and positioned to apply a cutting jet toward said edge; and means for cooling the body on the side opposite to that from which surface metal is being removed.

8. A machine for removing solid surface metal adjacent an edge of a metallic body, comprising the combination of a torch; a carriage supporting the torch for substantially universal adjustment relative thereto; said torch normally being disposed opposite the edge of said body and inclined at an acute angle from the horizontal for applying a cutting jet to said edge; and means for effecting translation of the carriage along the surface of the work, said carriage carrying means for extracting heat from the portions of said body to which said cutting jet is applied.

9. A machine for use in removing a portion from a metallic body, comprising the combination of a base adapted to rest upon one side of the said body; said base being constructed for circulating cooling fluid adjacent the body; a carriage having translatory movement along the base; a cutting torch adjustably mounted on the carriage and adapted to be positioned for cutting from the opposite side of the body from that upon which the base rests.

10. In a machine for removing solid surface metal adjacent an edge of a metallic body, the combination of means adapted to be mounted on the body adjacent an edge thereof for providing a cooling influence on one surface, and a nozzle adapted to be positioned opposite said edge and inclined at an acute angle from the horizontal for directing a cutting jet toward and along said edge adjacent the surface opposite to that subjected to the influence of said cooling means.

11. In a machine for removing solid surface metal adjacent an edge of a metallic body, the combination of a cooling member adapted to be mounted on the upper surface of the body and a torch inclined downwardly at an acute angle from the horizontal for directing a cutting jet toward and along said edge adjacent the lower surface of said body.

12. A machine for removing metal from a vertically disposed edge of a metal body including in combination a carriage adapted to be moved along a predetermined path on the top surface of the body, an arm connected to and extending transversely of the carriage and outwardly beyond said edge, a vertically slidable frame carried by the arm adjacent one end of the arm, means on the frame for supporting blowpipe means, means for causing the arm to move transversely of the carriage to locate said frame in position to direct the blowpipe means toward the edge of said body, and means for slidably raising and lowering the frame with respect to the arm to control the position of the blowpipe means relative to the upper margin of the vertically disposed edge of the body.

13. In apparatus for removing metal from a substantially vertically disposed edge surface of a body of ferrous metal, the combination of a track adapted to be secured to the top surface of said body; means for adjustably positioning said track into parallel relation with said edge surface; a carriage on said track; means for propelling said carriage along said track; an arm extending transversely from said carriage over said edge surface; a blowpipe-holder depending from said arm for securing a cutting blowpipe in position to direct an oxidizing jet against said edge surface; means permitting vertical adjustment of said blowpipe-holder to vary the elevation thereof; and means for positively rotating said blowpipe-holder to adjust the angle of inclination of the blowpipe with respect to said edge surface.

14. Apparatus as claimed in claim 13 wherein said means for positively rotating said blowpipe-holder comprises a gear sector secured to said blowpipe-holder, a worm supported by said arm for operative engagement with said gear sector, and manually operable means for rotating said worm.

15. A process of shaping the marginal edge of a metal plate to adapt said edge to abut against and cooperate with a similarly shaped edge, which comprises disposing said plate in a substantially horizontal position so that the surface of said edge is in a substantially vertical plane; progressively applying an oxidizing gas stream directly against successive portions of such vertically disposed surface of said marginal edge while said portions are at the oxygen ignition temperature of the metal, said stream being applied downwardly and obliquely against said vertically disposed surface so that the slag produced and the metal removed will fall from said plate by gravity; and cooling the top face of said plate adjacent said edge while said oxidizing gas stream is applied to the surface of said edge.

WALTER B. ROWLAND.
WALTER R. LINDEN.